United States Patent [19]
Becker et al.

[11] Patent Number: 5,934,631
[45] Date of Patent: Aug. 10, 1999

[54] HANGER BAR ASSEMBLY

[75] Inventors: Jessica R. Becker; Mark A. Bordwell, both of Memphis; Rene J. Thibodeau, Germantown, all of Tenn.

[73] Assignee: Thomas & Betts Corporation, Memphis, Tenn.

[21] Appl. No.: 08/699,609

[22] Filed: Aug. 19, 1996

[51] Int. Cl.⁶ .................................................. E04G 25/00
[52] U.S. Cl. .................................. 248/200.1; 248/298.1; 248/343; 248/906
[58] Field of Search ................................ 248/200.1, 906, 248/343, 298.1, 544; 403/104, 106, 110

[56] References Cited

U.S. PATENT DOCUMENTS

| | | |
|---|---|---|
| Re. 33,147 | 1/1990 | Reiker . |
| 1,211,182 | 1/1917 | Kruse ................................ 248/906 X |
| 1,850,616 | 3/1932 | Barnett ............................. 248/906 X |
| 2,023,083 | 12/1935 | Knell ................................ 248/906 X |
| 2,140,861 | 12/1938 | Steketee . |
| 2,670,919 | 3/1954 | Esoldi . |
| 2,713,983 | 7/1955 | Kay . |
| 2,770,436 | 11/1956 | Linhardt, Jr. . |
| 2,809,002 | 10/1957 | Rudolph . |
| 2,925,236 | 2/1960 | Cook et al. ......................... 248/200.1 |
| 2,930,564 | 3/1960 | Maier . |
| 2,963,253 | 12/1960 | Maier et al. . |
| 2,964,279 | 12/1960 | Galloway . |
| 3,053,494 | 9/1962 | Stoll ................................. 248/228.3 |
| 3,518,421 | 6/1970 | Cogdill . |
| 3,597,889 | 8/1971 | Lo Nigro . |
| 4,050,603 | 9/1977 | Harris et al. . |
| 4,391,428 | 7/1983 | Grimes . |
| 4,463,923 | 8/1984 | Reiker . |
| 4,513,994 | 4/1985 | Dover et al. . |
| 4,518,141 | 5/1985 | Parkin . |
| 4,538,786 | 9/1985 | Manning . |
| 4,659,051 | 4/1987 | Propp et al. . |
| 4,682,452 | 7/1987 | Propp et al. . |
| 4,684,092 | 8/1987 | Reiker . |
| 4,909,405 | 3/1990 | Kerr, Jr. . |
| 5,024,412 | 6/1991 | Hung et al. . |
| 5,044,582 | 9/1991 | Walters . |
| 5,074,515 | 12/1991 | Carter, Jr. . |
| 5,150,868 | 9/1992 | Kaden . |
| 5,303,894 | 4/1994 | Deschamps et al. . |
| 5,393,026 | 2/1995 | Deschamps et al. . |

OTHER PUBLICATIONS

Super Fan Brace, Instructions for Assembly–Installation, Reiker Enterprises Inc., Anniston, Alabama.
Super Fan Brace–Safety Brace Data Sheet, Reiker Enterprises Inc., Anniston, Alabama.
Heavy Duty Slide Support System, Reiker Enterprises, Inc., Anniston, Alabama.
Fan Brace Catelog, Fan Brace, Inc. Bryan, Texas.

*Primary Examiner*—Ramon O. Ramirez
*Assistant Examiner*—Derek J. Berger
*Attorney, Agent, or Firm*—Hoffmann & Baron, LLP

[57] ABSTRACT

A hanger bar assembly supports an outlet box between spaced apart support elements. The assembly includes a longitudinally expandable elongate support bar having a first elongate open ended channel member, and a second open ended channel member. The first channel member being slidably and telescopically received in the second channel member. A fastening element slidably supported within the first channel member. The channel members having adjacent facing surfaces, one of the surfaces having a gripping element for engaging the other surface. A mounting apparatus for attaching the outlet box to the fastening element. Upon securing the outlet box to the fastening element, the facing surfaces are urged together and the gripping element engages the other facing surface thereby restricting movement between said members. Additionally, an attachment member coupled to each opposed end of the support bar is provided. The attachment apparatus is securable to the spaced apart support elements for securing the hanger bar assembly.

19 Claims, 10 Drawing Sheets

HANGER BAR ASSEMBLY

FIELD OF THE INVENTION

The present invention relates generally to a hanger bar assembly for supporting electrical fixtures. More particularly, the present invention relates to a hanger bar assembly having telescopically engaged channel members and having a fastening plate to restrict the relative motion of the channel members as well as to secure an electrical outlet box to the channel members.

BACKGROUND OF THE INVENTION

In order to secure electrical fixtures such as lights and fans in ceilings, a hanger bar device is typically employed. It is very important that a fixture be adequately supported in the ceiling since improper support could lead to the fixture breaking away from the ceiling. Ceilings are typically constructed of structural members including a series of spaced joists which are covered by a plaster material or a gypsum wallboard often referred to as drywall. The ceiling covering material is not designed to support loads perpendicular to its surfaces. Therefore, in order to suspend electrical fixtures from a ceiling, the fixture's weight must be supported by the joists. To achieve this, a fixture may be secured directly to a joist, however, this limits the range of locations where the fixture may be placed. Such a limitation is problematic since it is often desirable to place the fixture in a specific position on the ceiling. Therefore, if no joist is adjacently positioned to the desired location, direct joist connection is not possible. A preferred solution for supporting electrical fixtures in the ceiling is the use of a hanger bar assembly. The hanger bar allows for the joists to be used for supporting an electrical fixture while still providing flexibility in positioning.

Hanger bar assemblies are typically extensible telescopic members that are disposed in between the ceiling joists and are securable thereto. An assembly's length, therefore, is adjustable to accommodate various joist spacing distances. Electrical outlet boxes, junction boxes and the like are then secured to the transverse members of the assembly. Such electrical boxes provide a termination point for electrical wiring as well as an attachment point for the electrical fixture. Typically the outlet box can be positioned at various points along the length of the members in order to properly position the fixture attached thereto. In conventional construction a cut out is made in the ceiling covering material in order to provide clearance for the electrical outlet box, thereby allowing the fixture to be secured to the outlet box.

The outlet box once secured to the hanger bar assembly is typically used to support the electrical fixture. The National Electric Code sets a maximum weight that an outlet box may support. Outlet boxes may either support lighting fixtures weighing up to 50 lbs. or ceiling fans weighing up to 35 lbs. Fixtures exceeding these weight limits must be supported independently of the box such as directly to the joists or other structural member.

Hanger bar assemblies can be divided into two general categories, standard and heavy duty and are distinguishable by the amount of weight they can safety support. Standard hanger bars are typically used to support lightweight lighting fixtures which are generally less than five pounds.

U.S. Pat. No. 2,925,236 to Cook et al. discloses a standard duty hanger bar assembly. The assembly includes telescopically engagable slotted channel members positionable between two ceiling joists. A box carrier is inserted in the channel members and has guide prongs extending from the slots. An outlet box is insertable over the prongs and is secured to the assembly by a box fastener which is securable to the box carrier by a threaded bolt. Upon the tightening of the bolt, a portion of the outlet box and a portion of the channel members are clamped together between the box carrier and fastener, thereby securing the box to the assembly. The box carrier, however, only engages a small amount of channel section thereby providing a relatively small clamping area. Therefore, the ability of the assembly to resist relative movement between the channel members is greatly limited and slippage is likely to occur if the assembly were to be subjected to a load such as a ceiling fan. Accordingly, this device is typically used to support relatively lightweight fixtures.

Heavy duty hanger bars are typically employed for supporting heavy lighting fixtures up to 50 lbs. and ceiling fans weighing 35 lbs. Ceiling fans require high load bearing supports not only due to their weight but also due to the torque and vibrational forces that are generate by the rotation of the motor and fan blades. Relatively small weight differences between the blades of a ceiling fan can produce rotational imbalances leading to large vibrational forces. Therefore, a heavy duty hanger bar is required when suspending electrical fixtures such as ceiling fans.

Heavy duty hanger bars assemblies must be able to maintain their rigidity and length under high load situations. A load acting perpendicular to the length of the telescopic members tends to deflect the assembly toward the direction of the load. The degree of deflection increases when the members are free to move relative to each other as the members tend to be pulled apart by the load. Under certain circumstances, the deflection could be to such a degree that the members could be pulled completely apart resulting in the release of the outlet box and fixture attached thereto. Therefore, it is important that once the assembly is installed the members be secured so that they resist motion between themselves.

Heavy duty hanger bars may be designed for installation in new work or old work applications. New work applications include installations where the ceiling covering material has not yet been installed and access to the joists is available. This may occur in situations such as new construction or renovations where the ceiling material has been removed. Old work applications include installations where the ceiling covering material is already installed and the hanger bar needs to be inserted into an outlet box clearance opening cut into the ceiling. In such applications access to the joists is typically extremely limited. This situation is typically found when a ceiling fan is to be installed in a location where a ceiling lighting fixture had previously been installed.

A hanger bar assembly capable of supporting loads such as ceiling fans and adapted for use in new work applications has been disclosed in the Heavy Duty Slide Support System by Reiker Enterprises Inc. This device includes telescopically engaged slotted channel members. The channels have a bottom wall formed by inwardly turned flanges defining a slot. Disposed within the channel members is a substantially planar plate having downwardly curved edges. The plate has two threaded bolts extending downwardly through the aligned slots. The threaded bolts extend through clearance holes in an outlet box and provide points on which to secure a fixture. A third threaded bolt extends from the center of the plate and is used to secure the box to the plate. The flanges of both channels extend downwardly at a slight angle. When the outlet box is secured to the channel members the flanges are forced together thereby clamping the two channel members together. The flanges, however, are relatively short thereby creating only a small amount of contact area between the flanges. Such limited amount of contact or clamping area limits the assembly's ability to resist slippage.

The Reiker Heavy Duty Slide Support System further includes a pair of end plates extending from the opposed ends of the assembly. The end plates are formed from upwardly bent extensions of the top wall of the channels. The end plates, therefore, are connected to the channels by a relatively thin strip of material. This design limits the assembly's ability to resist vibrational forces acting perpendicular to the channels. Such forces tend to cause the channel members to flex about the connection strip. This problem is exasperated by locating the connection strip above the assembly is neutral axis passing through the longitudinal centroid of the channel members. The offset between the connection strip and the neural axis creates a moment about the thin strip of connecting material and further reduces the assembly's ability to resist vibrational forces.

Hanger bar assemblies capable of supporting loads such as ceiling fans and adapted for use in old work applications have been disclosed in U.S. Pat. No. 5,150,868 to Keaden; U.S. Pat. No. 5,044,582 to Walters; U.S. Pat. No. 4,463,923 to Reiker.

Reiker discloses a heavy duty junction box hanger assembly including a brace having two elongated members that are threadedly coupled such that relative rotation of one member with respect to the other causes the hanger assembly to expand or contract. Thus, the length of the assembly is maintained by the engagement of the threaded coupling. The ends of the brace include spikes which engage the joist when the members are expanded. In order to install the assembly, expansion of the brace requires an installer to manually turn one of the members until the brace engages the joists. This is a time-consuming task especially in situations having a large distance between the joist. In addition, Reiker discloses a multi-component apparatus for securing the outlet box to the brace. First a two-part bracket must be secured to the brace and then the outlet box must be secured to the bracket assembly. This mounting method is time consuming and expensive to manufacture due to the various components involved.

The device disclosed in Keaden is similar to Reiker in that two members are threadedly engaged and expandable by rotation of one member with respect to the other. Hereto the length of the assembly is provided by the engagement of the threaded coupling. Keaden, however, addresses one of the problems associated with Reiker by employing a quick release mechanism that allows the members to extend freely without the need for rotation. The quick release mechanism releases the members from the normal threaded interconnection. Once released, the members can be expanded relatively quickly. In order to achieve this quick release capability, however, the device requires the use of a special nut assembly having various segments and a spring. The nut is designed to either clamp down for threaded engagement or expand for quick release position depending on which direction the members are moved. The Keaden design, therefore, is fairly complex requiring several components in order to achieve its benefits.

In addition to the various components required to achieve the quick release function, the Keaden design also requires the use of a separate piece in order to attach the outlet box to the transverse brace. Keaden discloses the use of a U-shaped saddle bracket that rests on top of the brace and is securable to an outlet box by way of fastening hardware.

Walters discloses slidably telescopically engageable tubes. The bottom walls of the tubes have apertures therein. The apertures permit a prying tool to be inserted therein in order to expand the tubes, thereby forcing teeth disposed at both ends of the brace into the joists. In order to prevent the members from shifting under the load of the fixture, a spring bias roller is employed. The roller bears down on the upper surface of the inner tube thereby creating constant lateral pressure. The force of the roller, however, acts over only a relatively small area. Additionally, the spring force is susceptible to weakening over time. Both of these factors create the possibility that slippage might occur allowing the tubes to shift, thereby releasing the teeth from the joist. In such a situation the only support would be provided by flanges which would be resting on and supported entirely by the ceiling. As previously stated, ceilings are not typically designed to support such loads, and therefore, the fixture could possibly fall from the ceiling.

In addition, the Walters design requires the use of a knurled tension wheel, a spring and a housing which supports the assembly in order to restrict the relative motion of the members. Furthermore, Walters discloses a separate component for supporting an outlet box to the tubes comprising a bracket which is adapted to straddle over the upper end of the outer tube and which is connected to a second bracket which is adapted to ride on the bottom portion of the outer tube. Mounting bolts extend through both brackets into an outlet box which is secured in a conventional manner by nuts and bolts. These extra components increase the manufacturing costs of the assembly.

Accordingly, it would be desirable to devise a hanger bar assembly capable of supporting heavy loads such as ceiling fans that can be quickly installed and relatively simple to produce as well as being sufficiently rigid to resist vibrational forces under the heavy load of a fixture.

SUMMARY OF THE INVENTION

It is an object of the present invention to provide a hanger bar assembly for supporting an outlet box and an electrical fixture in a ceiling.

It is another object of the present invention to provide a hanger bar assembly having a pair of hollow telescopically extensible channel members, and a fastening device disposed within the channel members and adapted to secure an outlet box to the members and to restrict relative movement of the channel members.

It is yet a further object of the present invention to provide a hanger bar assembly having a pair of hollow telescopically extensible members. The members having adjacent facing surfaces with one of the surfaces having a gripping element for engaging the other surface. A fastening element being disposed within the members adjacent the surfaces and adapted to secure the outlet box. Upon securing the outlet box to the fastening element, the facing surfaces are urged together and the gripping element engages the other facing surface thereby restricting movement between the members. The assembly further includes devices for securing the members to spaced apart support elements.

In the attainment of these and other objects the present invention provides a hanger bar assembly for supporting an outlet box between spaced apart support elements. The assembly includes a longitudinally expandable elongate support bar having a first elongate open-ended channel member and a second open ended channel member. The first channel member is slidably and telescopically received in the second channel member. The channel members have adjacent facing surfaces with one of the surfaces having a gripping element for engaging the other surface. The assembly further includes a fastening element slidably supported within the first channel member including a mounting apparatus for attaching the outlet box to the fastening element. Upon attaching the outlet box the first and second channel members are clamped between the fastening element and the box and the facing surfaces are urged together such that the gripping element engages the other facing surface, thereby restricting movement between the first and second channel members. The assembly further includes an attachment member coupled to each opposed end of the support bar. The attachment members are securable to the spaced apart support elements for securing the hanger bar assembly thereto.

As more specifically described by way of the preferred embodiment herein, the present invention provides a support apparatus including a first elongated channel member telescopically receivable within a second elongated channel member for longitudinal adjustment of the support device. The channels have similarly shaped cross-sections that are substantially trapezoidal-shaped. Each of the channels has a back wall and a pair of spaced side walls depending therefrom. The side walls having inturned flanges spaced from the back wall forming a channel interior. The flanges having spaced opposing ends that define a slot extending the length of the channel, and the channels are positioned such that the slot of the first channel is aligned with the second channel slot. The flanges extend at an angle inwardly toward the channel interior. The assembly also includes a fastening plate disposed within the first channel and slidably supported by the flanges of the first channel. The fastening plate includes a structure for securing the outlet box to the assembly, whereby upon securement of the outlet box to the fastening plate, longitudinal movement of the channels is restricted. The assembly further includes a pair of end plates for securing the assembly to a structure. One end plate is coupled to the distal end of each channel member and disposed in opposed relation at opposite ends of the support apparatus.

Furthermore, upon the securement of the outlet box to the fastening device the flanges of each of the channels are urged together. The upper flange surfaces of the second channel member include a gripping portion includes knurls that engage the flanges of the first channel locking the members together when the outlet box is secured.

DETAILED DESCRIPTION OF THE PREFERRED EMBODIMENT

Figure 1:
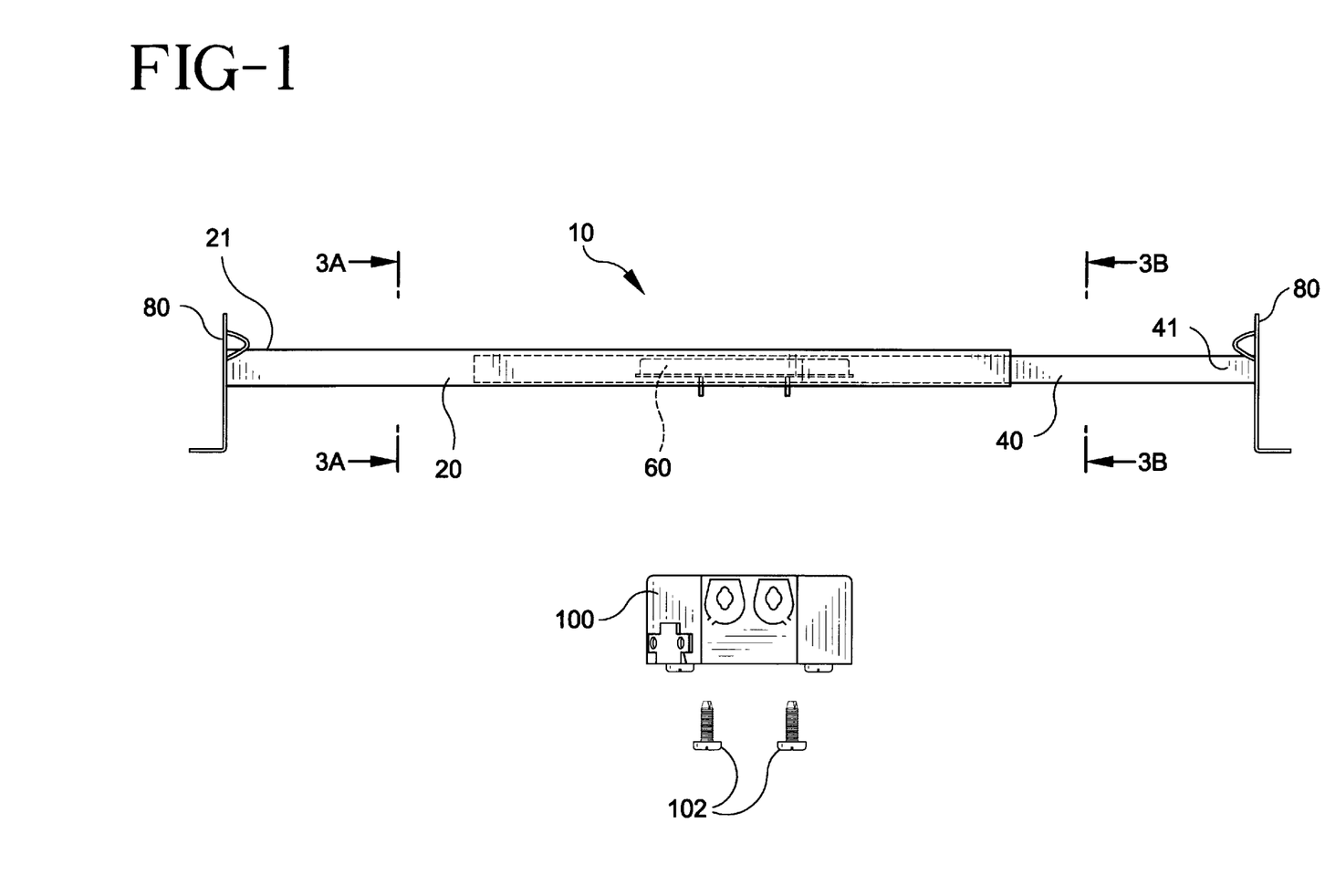
FIG. 1 is a side elevational view of the hanger bar assembly of the present invention including an outlet box.

Referring to FIG. 1, a hanger bar assembly 10 formed in accordance with the preferred embodiment of the present invention is shown. Assembly 10 may be used in applications where the ceiling covering material such as plaster or drywall has yet to be installed and where the joists are substantially exposed. Assembly 10 includes an external channel member 20, an internal channel member 40, end plates 80 and a fastening plate 60. The assembly is positionable between spaced apart ceiling joists (not shown) and securably engagable therewith. An outlet box, junction box, or the like 100 can be secured to the assembly in order to provide a point for securing a relatively heavy electrical ceiling fixture such as a lighting fixture or ceiling fan (not shown). Hanger bar assembly 10 and the joists provide the necessary support for the fixture.

Figure 2:
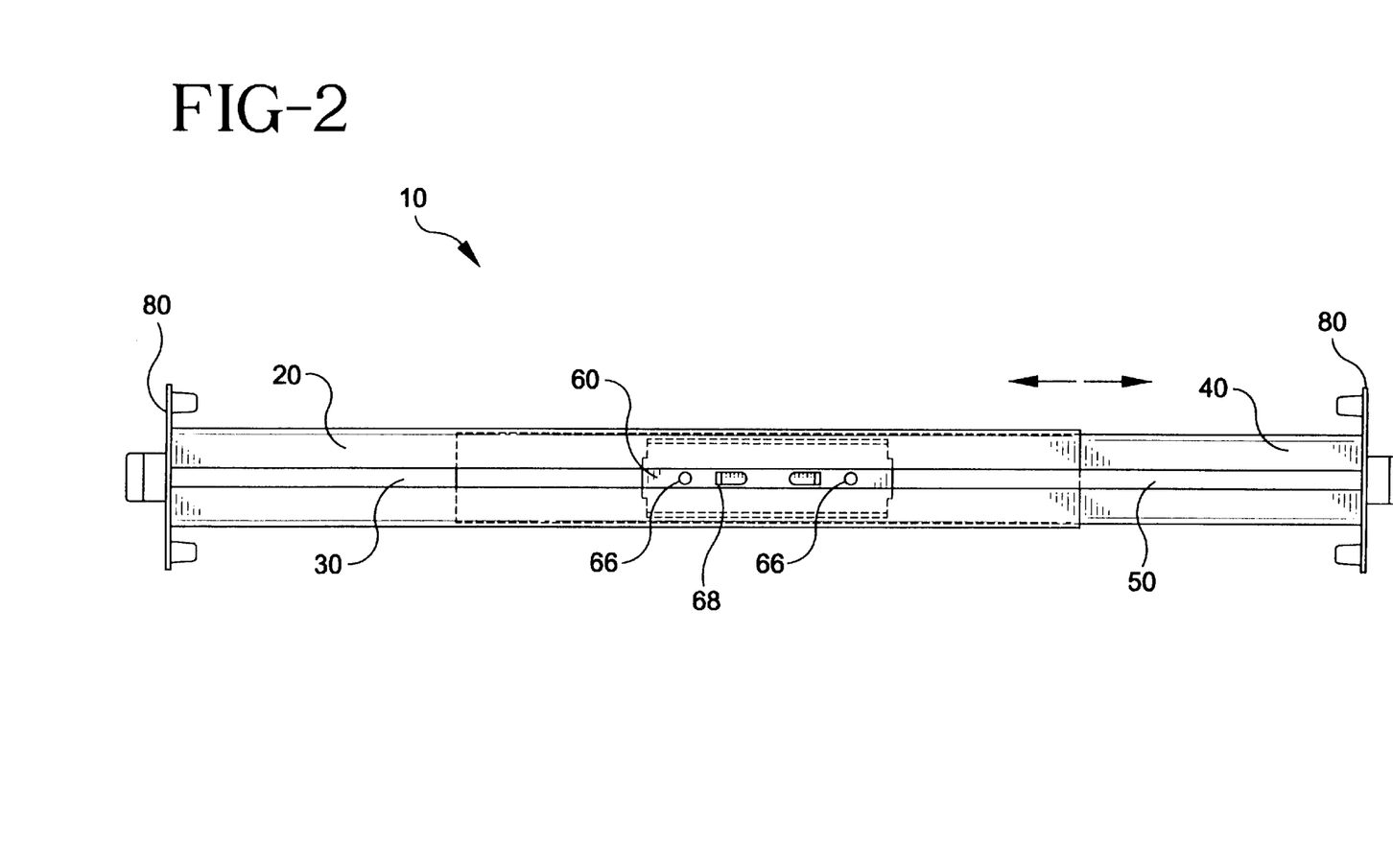
FIG. 2 is a bottom elevation view of the assembly without the outlet box of FIG. 1.

Referring also to FIG. 2, channel members 20,40 are telescopically engagable elongate members forming a support apparatus. Internal channel member 40 is freely slidable within external channel member 20, thereby allowing for the length of assembly 10 to be easily adjusted. The channel members are preferably formed of a metallic material such as steel having an anti-corrosive finish.

Figure 3A:
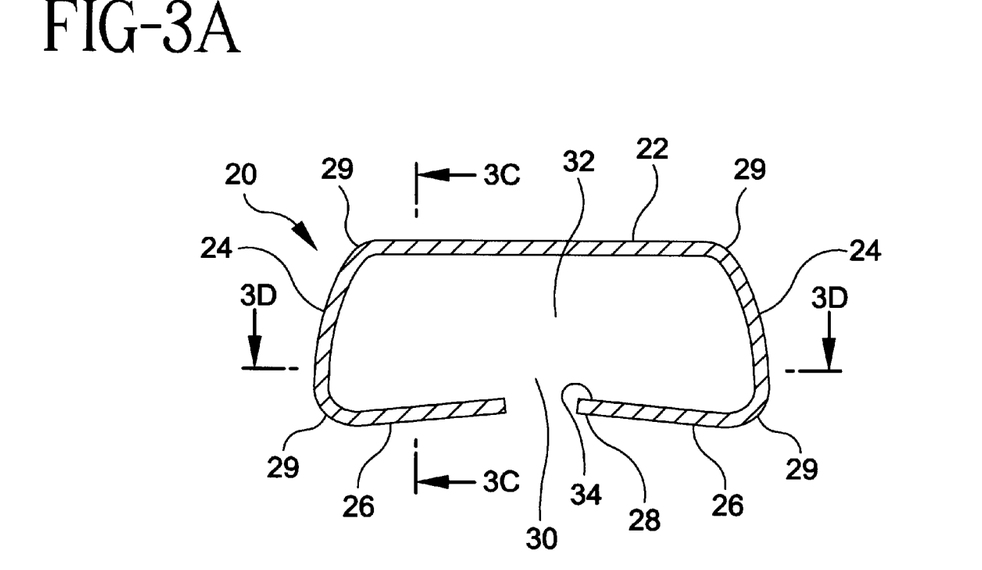
FIG. 3A is a cross-sectional view of the external channel member taken through line 3A—3A of FIG. 1.
Figure 3B:
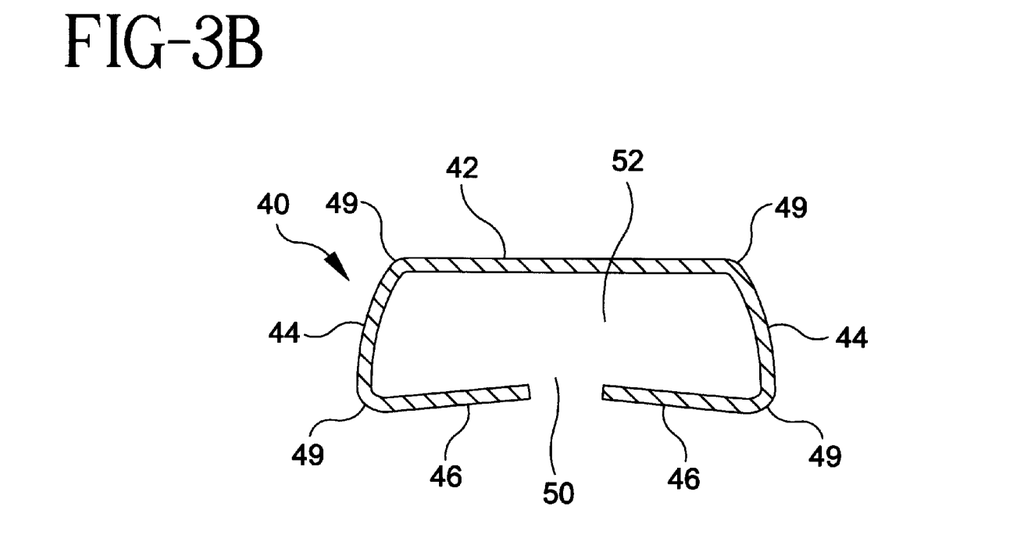
FIG. 3B is a cross-sectional view of the internal channel member taken through line 3B—3B of FIG. 1.

Referring to FIGS. 3A and 3B, external channel member 20 includes a back wall 22 and a pair of spaced side walls 24 extending downwardly therefrom. Side walls 24 have inturned flanges 26 projecting inwardly and spaced from back wall 22 forming a channel interior 32. The flanges form the bottom surface of external channel member 20. Flanges 26 have spaced opposing ends 28 defining a slot 30 that extends the length of external channel member 20. Rounded corners 29 provide a transition between walls 22 and 24 and flanges 26. External channel member 20 preferably has a substantially trapezoidal shaped cross-section with back wall 22 being smaller in width than the channel member bottom surface formed by flanges 26. Accordingly, side walls 24 tend to project outwardly as they extend from back wall 22 to flanges 26.

Figure 7:
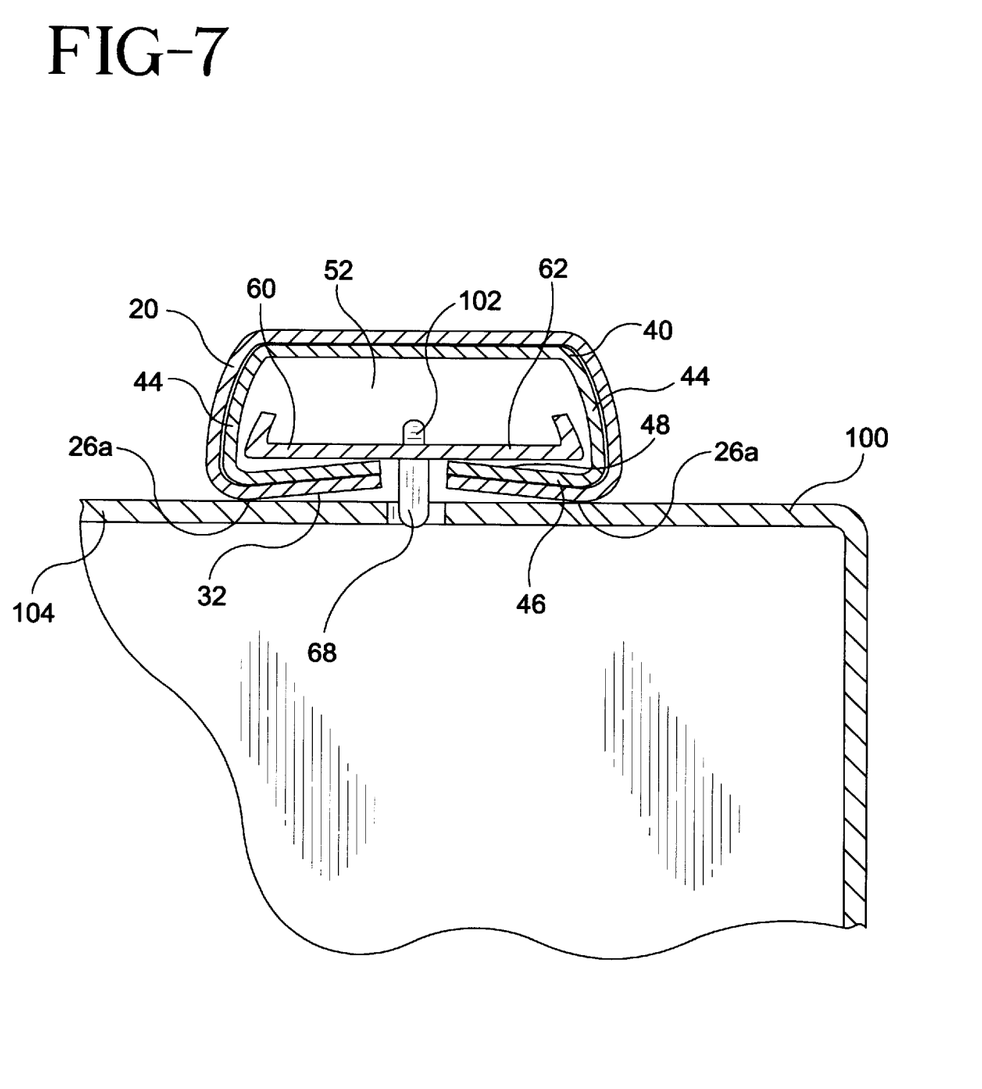
FIG. 7 is a cross-sectional view illustrating the hanger bar assembly secured to an outlet box.

Internal channel member 40 is similarly formed to external channel member 20 and has a back wall 42 depending side walls 44 and inturned flanges 46 forming a channel interior 52. Flanges 46 defined a internal channel slot 50 extending the length of the internal channel 40. Rounded corners 49 provide a transition between walls 42,44 and flanges 46. Internal channel member 40 has a similar cross-sectional shape as external channel member 20. However, internal channel member 40 is a slight degree smaller sized in cross-section then external channel member 20 so that it is intimately receivable within external channel member 20 and is freely slidable therein. The channel members are preferably formed such that there is no interference between the interior 40 and exterior 20 channels. A limited amount of interference between members, however, is permissible as long as the channels remain slidable relative to each other. When channels 20 and 40 are inserted, slots 30,50 align thereby providing access into the interior 52 of internal channel member 40 as shown in FIG. 7. The length of the assembly 10 can be easily and quickly adjusted to the distance between ceiling joists, thereby facilitating speedy installation of the assembly.

A hanger bar assembly that is used to support a ceiling fan is subjected to a variety of linear and rotational forces. Such complex loadings result from rotational imbalances inherent in the ceiling fan. The loadings and their frequencies tend to change with the speed of the fan motor. Accordingly, it is very important for a hanger bar assembly in a ceiling fan application to be able to accommodate such loadings.

The cross-sectional shape of external and internal channel members 20,40 maximizes the assembly's 10 ability to withstand both static loads and dynamic vibrational forces given the amount of material used. Such mechanical strength is achieved due in part to the channel members' trapezoidal cross-sectional shape each having the bottom surface, formed by the flange sections, being wider than the back wall. This shape creates a longitudinal center of gravity C—C that is below the geometric center line L—L of the channel members, as shown in FIG. 5B. Such a configuration reduces the distance between the center of gravity and the outlet box. Therefore, the amount of torque that can be exerted by a fixture mounted to the outlet box, such as a ceiling fan, is minimized.

In addition, by using rounded corners 29,49 and minimizing the width of the slots 30,50 the mechanical strength of the assembly is increased, thereby allowing the assembly to adequately support heavy fixtures. In the preferred embodiment, slots 30,50 have a width of approximately 0.20 inches. By minimizing the slot width the assembly's ability to resist torsional moments due to vibrations about the length of the assembly is enhanced.

In the preferred embodiment as shown in FIGS. 3A and 3B, flanges 26,46 are inclined slightly upwardly toward their corresponding channel interiors 32,52. Therefore, when outlet box 100 is secured to assembly 10, the box engages only the edges 26a of external channel member 20 as shown in FIG. 7. This provides a more stable mounting surface for an outlet box than if flanges 26,46 were flat. Due to irregularities in outlet box manufacturing the back wall 104 of the box tends to be irregularly shaped in center and may have high spots and low spots. If such an uneven surface were mounted to flat flanges, only the high spots would engage the flanges resulting in an unstable attachment. However, by using only the outer edges 26a of the flanges, the smoothness of the outlet box surface is less significant, and a more stable connection can be achieved. The upwardly inclined flanges also provide for enhances slip resistance between channel members 20,40 as will be further described below.

Referring back to FIGS. 1 and 2, assembly 10 further includes a pair of similarly formed end plates 80, one being secured to the distal end 21 of the external channel member 20 and the other being secured to the distal end 41 of the internal channel member 40. Therefore, end plates 80 are disposed in opposed relation at opposite ends of the support apparatus. End plates 80 secure the channel members 20,40 to the joists.

As shown in FIGS. 5A, 5B, 6A, and 6B, each end plate 80 has a generally planar upper portion 81 and a leg 90 depending downwardly therefrom. The upper portion 81 of each end plate includes mounting holes 82 through which fastening hardware such as nails or screws (not shown) may be inserted into the joist thereby securing hanger assembly 10 to the joists. Screws are preferably used in order to provide the superior securement of the assembly.

Figure 5A:
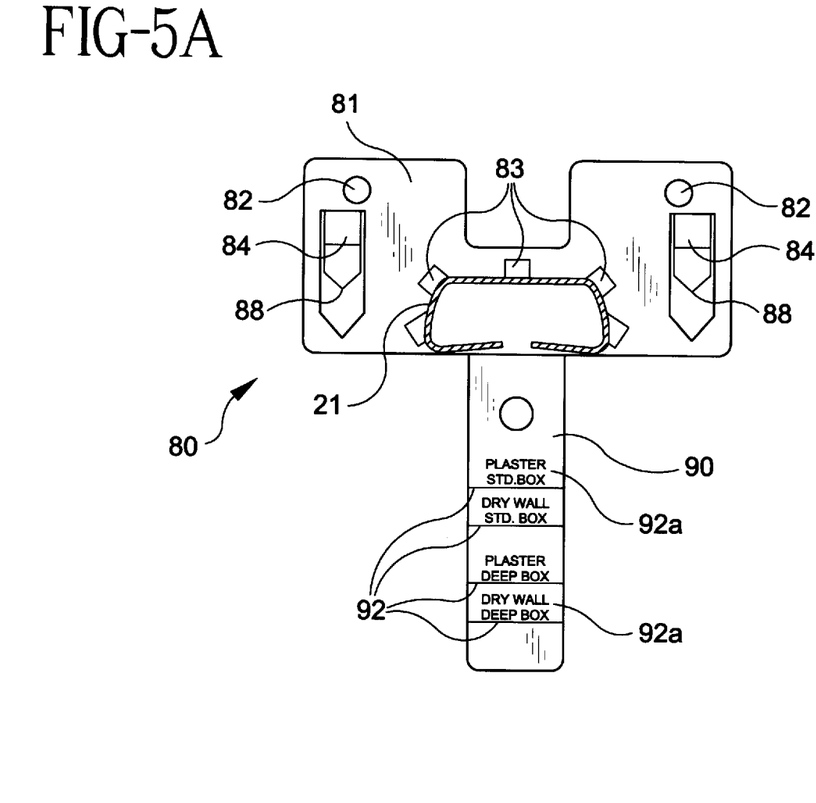
FIG. 5A is a front elevational view of an embodiment of the end plate of the present invention with the external channel member shown in cross-section.
Figure 5B:
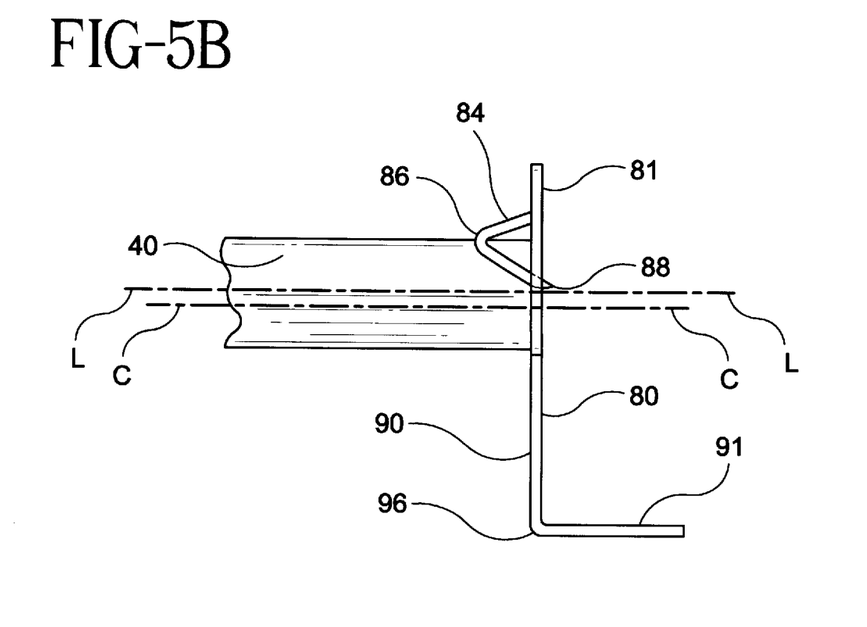
FIG. 5B is a side elevational view of an alternative embodiment of the end plate of the present invention.
Figure 6A:
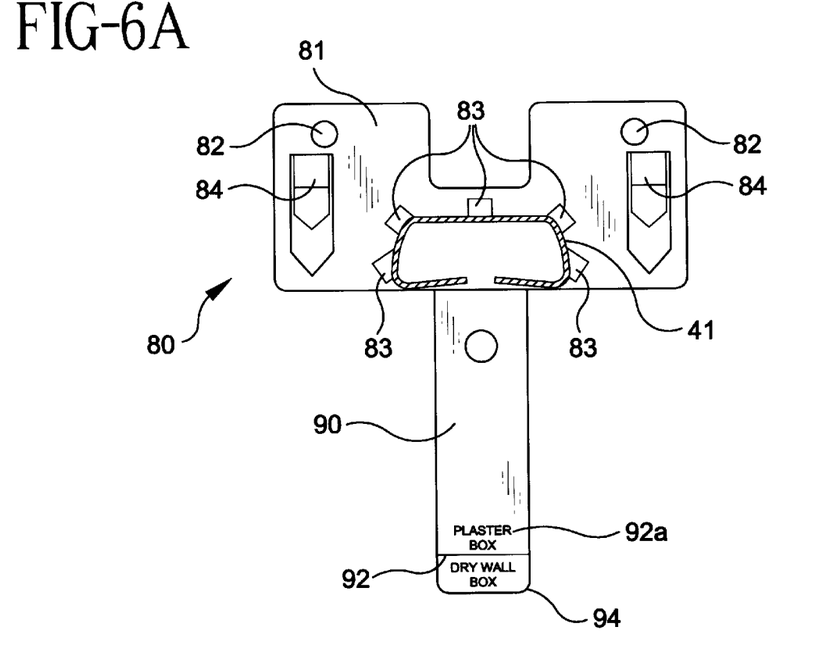
FIG. 6A is a front elevational view of a further alternative embodiment of the end plate of the present invention with the internal channel member shown in cross-section.

As shown in FIGS. 5A and 6A, end plates 80 are secured about the perimeter of the channel members at various attachment points 83 of distal ends 21,41 of the channel members. Such a multi-point connection provides a strong and rigid connection between the channel members and the end plates. Each channel member 20,40 is preferably welded to an end plate 80 at the attachment points 83. Attachment points 83 are preferably located adjacent to the corners of the channel members and along the back walls 22,42 of the channel members. Alternatively, attachment points 83 may be located such that a portion of each channel members' back wall, side walls and flanges are connected to the end plate. By attaching the end plates as described, channel members 20,40 are effectively secured to end plates 80 about the longitudinal center of gravity C—C of the channel members, as shown in FIG. 5B. This reduces potential moments that would result if the end plates were only secured to one edge of the channel member. Such moments would increase the forces exerted on the assembly and could lead to increased deflection and vibrational effects of the channel members.

Each end plate 80 preferably further includes a pair of spurs 84 that are used to temporarily hold the assembly to the joists until the fastening hardware is installed. Spurs 84 are preferably formed from a stamped out portion of the end plate itself and are shaped to form a V-shaped member as shown in FIG. 5B. Each spur 84 has a bent elbow portion 86 and a point 88. When an installer strikes elbow portion 86 with a hammer, point 88 is driven into the joist. After the spurs of both end plates are driven into the joists, the assembly does not need to be supported by the installer. Therefore, the installer will have both hand free to install the permanent fastening hardware which facilitates speedy permanent installation.

With reference to FIGS. 5A and 6A, downwardly depending leg 90 includes various score lines 92 along its length. Score lines 92 act as guides for locating assembly 10 with respect to the joists. It is important to properly locate the assembly since after an outlet box is secured to the assembly the face of the box must be generally flush with the front face of the ceiling covering material. The proper location of the assembly with respect to the joists is a function of outlet box depth and the ceiling covering material used. The deeper the box the higher the assembly must be secured on the joists. In addition, a plaster ceiling requires the assembly to be located lower than for a drywall ceiling. Score lines 92, therefore, are labeled 92a with the box type and ceiling material. Proper location is achieved when the score line 92 on each end plate 80 indicating the specifics of the application is aligned with the bottom of the joist. Therefore, it is preferable that the labeling 92a of the score lines be located on the side of the end plate attached to the channel member so that an installer is able to see the markings when holding the assembly up to the joists. Additionally, score lines 92 are of such a depth that leg 90 may be easily deformed or fractured along a particular score line by the installer as required.

FIG. 5A shows an embodiment of end plate 80 having a straight leg 90. However, since the most common application involves a standard depth metallic outlet box set in a ceiling covered by drywall, it is desirable to form the leg so that it allows for easy assembly installed on such applications. Therefore, in the preferred embodiment shown in FIG. 5B, leg 90 may be pre-bent by the manufacturer outwardly along the drywall standard box line forming a tab portion 91. Leg 90 is bend so that tab 91 is at a right angle with respect to the portion of the leg above the bend 96. Accordingly, when tab 91 is seated on the bottom of the joist, the assembly is properly positioned for a standard box drywall application. Such a feature promotes simple alignment of the assembly. If the assembly is used in other than a drywall standard box application, an installer may simply bend the leg about the score line corresponding to the applicable situation.

Figure 6B:
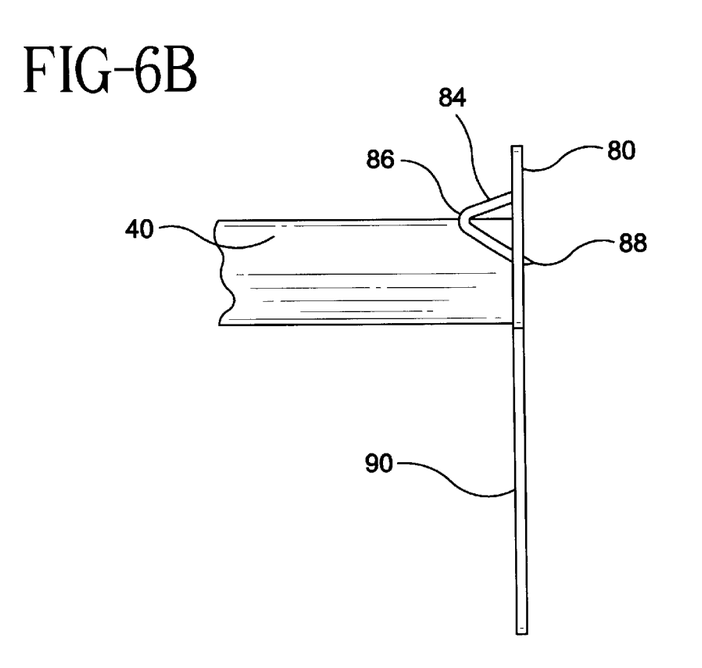
FIG. 6B is a side elevational view of the alternative embodiment of the end plate of FIG. 6A.

FIGS. 6A and 6B show an end plate embodiment adapted for use with plastic outlet boxes which typically are available in only one depth for ceiling fixture applications. Therefore, only one score mark 92 is used to show the alignment point for plaster ceilings and the bottom edge 94 of leg 90 marks the alignment point for drywall ceilings.

When an electrical fixture is secured to assembly 10 the resultant load acting downwardly thereon tends to bow the assembly forcing the channel members apart. If the members were permitted to move in relation to each other this tendency to bow would not be restricted, and the resultant sagging would present an opportunity for the channel members to slip apart and release the outlet box. If this were to occur, the fixture could come loose from the ceiling leading to a potentially hazardous situation due to the weight of the fixtures. However, by restricting relative movement of the channel members, the assembly's 10 rigidity is increased, and its tendency to bow downwardly is greatly reduced. Additionally, in applications involving ceiling fans the assembly experiences torques and vibrational forces as well as static loadings. The assembly's resistance to these dynamic forces is also increased when the rigidity of the assembly is increased. In order to provide such rigidity, a locking device including fastening plate 60 is employed.

With reference to FIGS. 4A–4C, and 7 fastening plate 60 will now be described. Fastening plate 60 is preferably a metallic member positionable and freely slidable within internal channel member interior 52. Plate 60 is supported by the upper surface 48 of internal channel member flanges 26 and rides thereon. Plate 60 has a generally rectangular planar base portion 62. In the preferred embodiment, base portion 62 includes a pair of edge walls 64 extending upwardly from the edges of base portion 62 and are angled inwardly so that they project over base portion 62. Edge walls 64 aid in providing additional rigidity to fastening plate 60. Edge walls 64 are formed so that they do not frictionally engage side walls 44 of internal channel member 40 so that plate 60 is freely slidable within channel member 40.

Base portion 62 further includes a pair of spaced apertures 66 extending therethrough. As shown in FIG. 2, apertures 66 are positioned on base portion 62 so that they align with channel slots 30,50 and are, therefore, accessible to an installer when plate 60 is inside the channel members. Apertures 66 provide a point for mounting and securing outlet box 100 to hanger bar assembly 10 and are so spaced as to be usable with mounting holes formed on both metallic and nonmetallic boxes. Apertures 66 may be internally threaded and adapted to receive outlet box mounting screws 102. Alternatively, apertures 66 may be unthreaded and adapted to receive self-taping screws. Therefore, in order to secure box 100 to plate 60 screws are inserted through opening in the back wall 104 of box 100 and screwed into apertures 66.

Fastening plate 60 further includes a pair of projections 68 extending downwardly from base portion 62. Projections 68 extend through channel slots 30,50 and extend beyond the flanges 26 of external channel member 20 as shown in FIG. 7. Projections 68 are adapted to engage clearance holes found in the back wall of standard outlet boxes thereby providing alignment for outlet box 100. Projections 68 also provide a grabbing area for the installer so that fastening plate 60 may be moved along the length of hanger bar assembly 10 to the desired position. By moving plate 60 along the length of the assembly the installer has a wide range of positions along which a fixture can be mounted as long as the fastener is placed within the area where the external and internal channel members overlap.

In addition to providing a mounting site for outlet box 100, fastening plate 60 further acts as a locking device to prevent the relative movement between channel members 20,40 when subjected to a loading force. By serving this duel purpose the present invention eliminates the need for separate and additional components, thereby reducing the cost of manufacturing and assembly.

Referring to FIG. 7, plate base portion 62 is supported by the upper surface 48 of internal channel flanges 46. Once the channel members have been expanded to the desired length and fastening plate 60 has been properly positioned, outlet box 100 may be secured to the assembly. As previously described, outlet box 100 is secured to plate 60 by threaded fastening means such as screws 102. Upon rotation of screws 102, plate 60 is drawn toward and urged against flanges 46. Simultaneously, outlet box 100 is urged against the bottom surface 32 of external channel flanges 26. Thus, flanges 26,46 of both channel members become clamped together when outlet box 100 is secured to plate 60.

When the channel members 20,40 are urged together the relative movement of the channel members is greatly restricted. In addition, any side to side movement resulting from the clearance between the channel members is prevented and the overall rigidity of assembly 10 is increased. Furthermore, fastening plate 60 is restricted from moving thereby securing the position of outlet box 100. When box 100 is tightly secured, plate 60 acts along a relatively long length of channel, preferably approximately 4 inches. By doing so a substantial length of channel is forced together thereby providing significant resistance to longitudinal channel movement Therefore, a degree of slip resistance is achievable that is significantly greater than was previously available in prior art hanger bar devices.

Further slip resistance is provided by engagement between the channel member side walls 24,44. When plate 60 is forced against upwardly inclined flanges 46 of internal channel 40, the vertical force is broken down into a vertical and horizontal component. The vertical component of the clamping force tends to deflect flanges 46 downwardly. This downward deflection results in flanges 26,46 being urged together as described above. The horizontal component of the clamping force tends to deflected flanges 46 slightly outwardly. The outward deflection results in a wedging action that creates an area of engagement in the corners 29,49 of channel members 20,40 adjacent flanges 26,46 and side walls 24,44. The area of engagement along the side walls further tends to increase the hanger bar assembly's ability to resist slippage under high load conditions.

Figure 3C:
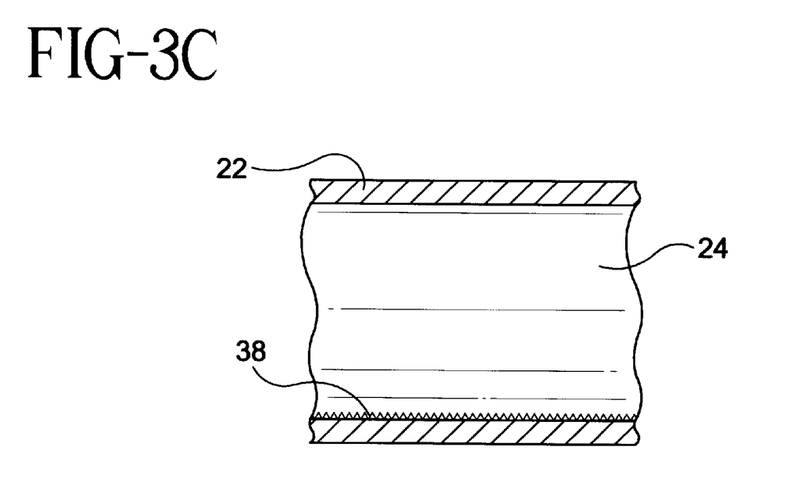
FIG. 3C is a partial cross-sectional view of the external channel member taken through line 3C—3C of FIG. 3A showing an embodiment of the gripping portion of the present invention.
Figure 3D:
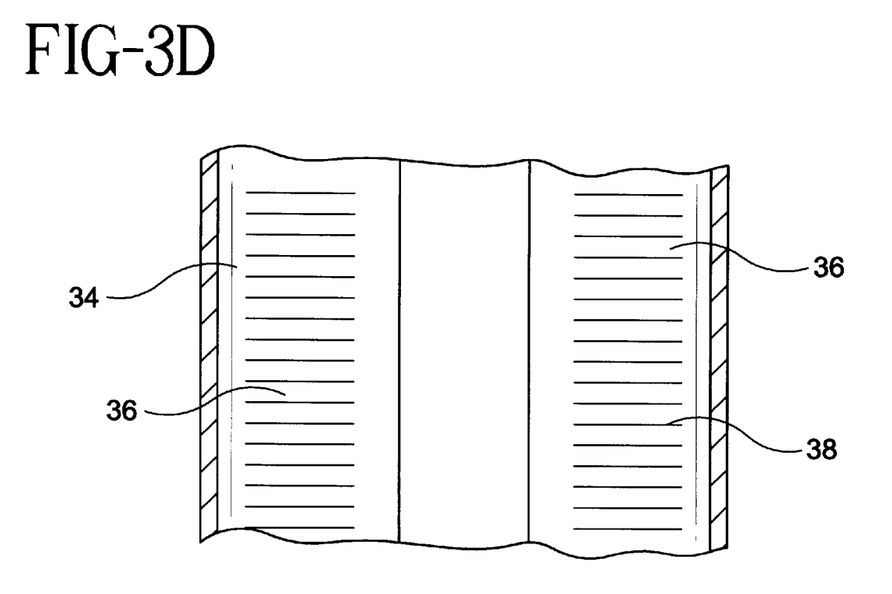
FIG. 3D is a partial cross-sectional view of the external channel member taken through line 3D—3D of FIG. 3A showing the gripping portion of FIG. 3C.

In order to increase the effectiveness of the horizontal component of the clamping force, upper flange surfaces 34 of external channel member 20 may include a gripping portion 36 extending the length of the channel member as shown in FIGS. 3C and 3D. Gripping portion 36 may include a plurality of spaced ridge-like projections 38 that are engagable with the flanges of the exterior channel member. The projections are preferably knurls and may be produced in a manner well known in the art. In an alternative embodiment (not shown), gripping portion 36 may be formed on the outer flange surface of internal channel member 40 or formed on both the internal and external channel members.

As the channel members are compressed together, knurls 36 create grooves in flanges 46 which tends to lock the channel members together. Therefore, knurls 38 create greater frictional force between internal 40 and external 20 channel members when outlet box 100 is tightened to fastening plate 60. The fastening plate 60 is of sufficient length to compress an area of optimum engagement. This engagement of knurls extends over the length of plate 60 as well as over area the length of the channels adjacent plate 60. This in turn increases the assembly's ability to support relatively heavy loads.

Figure 3E:
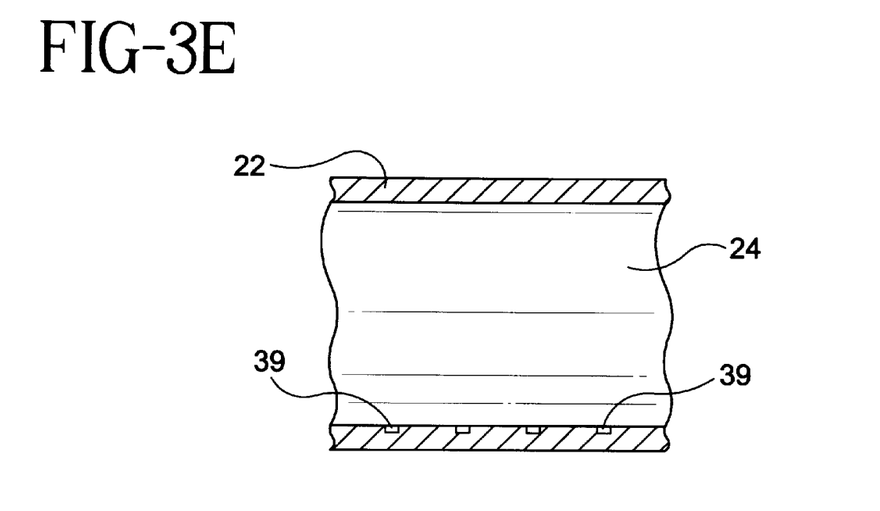
FIG. 3E is an enlarged partial cross-sectional view of the external channel member similar to that shown in FIG. 3C showing an alternative embodiment of the gripping portion.
Figure 3F:
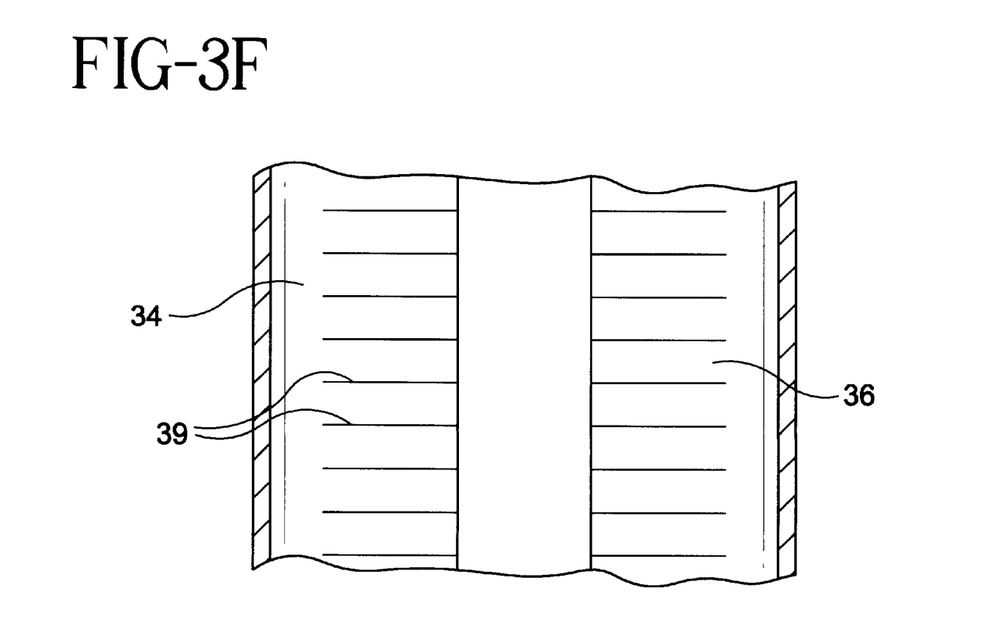
FIG. 3F is a partial cross-sectional view of the external channel member similar to that shown in FIG. 3D showing the gripping portion of 3E.
Figure 4A:
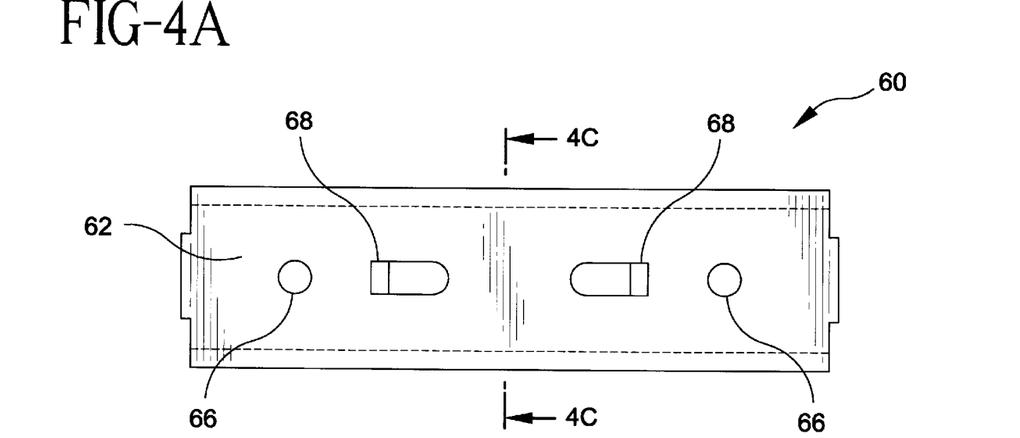
FIG. 4A is a bottom elevational view of the fastening plate of the present invention.
Figure 4B:
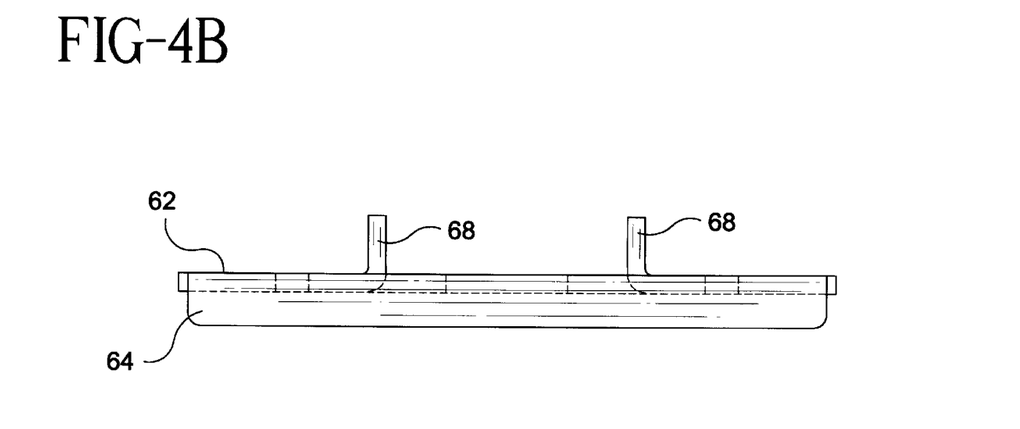
FIG. 4B is a side elevational view of the fastening plate of the present invention.
Figure 4C:
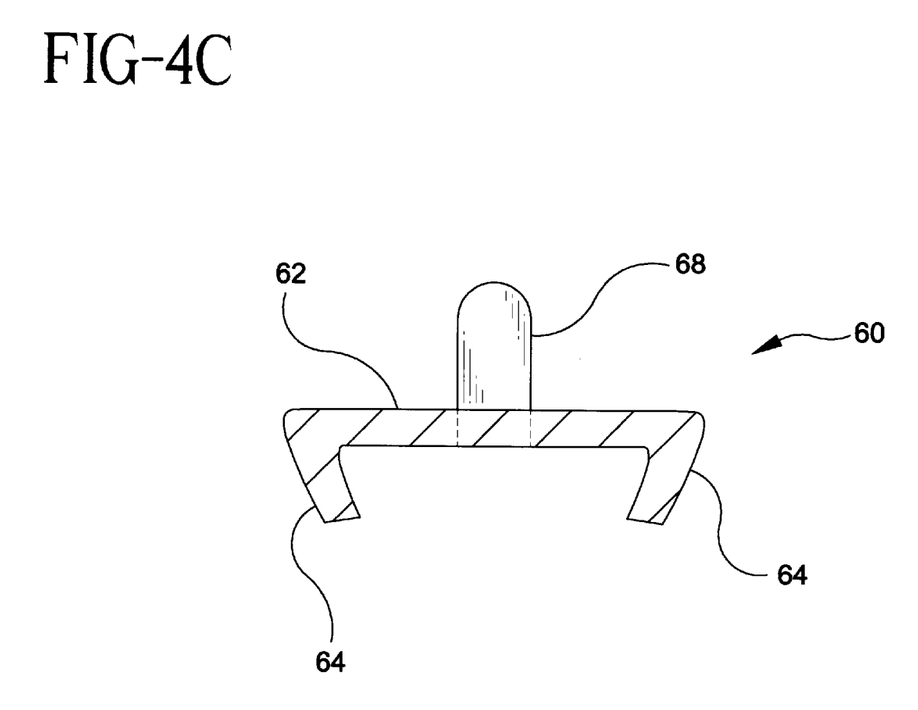
FIG. 4C is a cross-sectional view of the fastening plate of the present invention taken through line 4C—4C of FIG. 4A.

An alternative preferred embodiment of gripping portion 36 is shown in FIGS. 3E and 3F. In this embodiment, a plurality of spaced parallel grooves 39 are formed on the upper flange surfaces 34 of external member 20. Grooves 39 form an irregular non-smooth surface which increases the frictional coefficient of the surface. Therefore, when the channel members are urged together, upon securement of outlet box 100, the resistance to slippage between channel members 20,40 is increased. The present invention also contemplates the use of various shaped projections or other surface irregularities that would be engagable with an opposing flange surface for enhanced slip resistance between the channel members.

Various changes and modifications can be made to the invention, and it is intended to include all such changes and modifications as come within the scope of the invention as is set forth in the following claims.

What is claimed is:

1. A hanger bar assembly for supporting an outlet box between spaced apart support elements comprising:
   a longitudinally expandable elongate support bar including;
      a first elongate open ended channel member defining a channel interior; and
      a second elongate open ended channel member, said first channel member being slidably and telescopically received in said second channel member, each of said first and second channel members include a back wall and a pair of spaced side walls depending therefrom, said first channel member having a first facing surface being obliquely inclined into said channel interior toward said back wall and said second channel member having a second facing surface being obliquely inclined into said channel interior toward said back wall, and said first facing surface being adjacently disposed from said second facing surface, one of said first and second facing surfaces having a gripping element for engaging said other of said first and second facing surfaces;
   a fastening element slidably supported within said channel interior and adapted to secure the outlet box such that upon securing the outlet box to said fastening element, said first and second channel members are clamped between said fastening element and said outlet box and said first and second facing surfaces are urged together such that said gripping element engages said other of said first and second facing surfaces thereby restricting movement between said first and second channel members; and
   an attachment member coupled to each opposed end of said support bar, said attachment members being securable to the spaced apart support elements for securing said hanger bar assembly thereto.

2. A hanger bar assembly of claim 1 wherein said gripping element includes a plurality of adjacently disposed grooves forming an irregular surface.

3. A hanger bar assembly of claim 1 wherein said gripping element includes a plurality of adjacently disposed ridge-like projections for engaging said other facing surface.

4. A hanger bar assembly of claim 1 wherein said side walls having inturned flanges spaced from said back wall, said flanges of said first channel member forming said first facing surface and said flanges of said second channel member forming said second facing surface, said flanges of said first and second channel members each having spaced opposing ends that define a slot extending the length of said corresponding first and second channel member, said first and second channel members being positioned such that said slot of said first channel member is aligned with said slot of said second channel member and wherein said fastening element is supported by said flanges of said first channel member.

5. A hanger bar assembly of claim 4 wherein said flanges have an upper and lower surface, and said upper flange surface of said second channel member having said gripping element extending the length of said second channel member, said gripping element engaging said flange bottom surface of said first channel member when said outlet box is secured to said fastening element, engagement of said gripping element providing increased resistance to relative longitudinal movement of said first and second channel members.

6. A hanger bar assembly of claim 4 wherein said first and second channel members each further include a plurality of corner portions connecting said side walls to said back wall and said side walls to said flanges, said corners being generally rounded providing a smooth transition between said side wall, said back wall, and said flanges.

7. A hanger bar assembly of claim 6 wherein said first and second channel members have a substantially trapezoidal shaped cross-section to provide increased resistance to static and dynamic vibrational forces.

8. A hanger bar assembly of claim 4 wherein said fastening element includes a plate having a generally planar surface and a pair of spaced walls extending therefrom, said pair of walls extending toward said channel member back wall and inclined inwardly over said plate such that said pair of walls do not bear against said first channel member side walls thereby permitting said plate to move freely within said first channel member prior to securing said outlet box.

9. A hanger bar assembly of claim 8 wherein said plate includes a plurality of projections extending downwardly therefrom, said projections extending through said slots and being engageable with said outlet box to provide alignment therefor.

10. A hanger bar assembly of claim 4 wherein said fastening element includes a plurality of apertures formed therein, said apertures being aligned with said slots in said first and second channel members and being adapted to threadedly engage outlet box securing hardware.

11. A hanger bar assembly of claim 4 wherein each of said attachment members is secured to a corresponding channel member at a plurality of attachment points located generally about a perimeter of said corresponding channel member.

12. A hanger bar assembly of claim 11 wherein said first and second channel members each further include a plurality of corner portions connecting said side walls to said back wall and said side walls to said flanges, and said attachment points are located adjacent said corners.

13. A hanger bar assembly of claim 1 wherein each of said attachment members include a plurality of apertures extending therethrough and adapted to permit mounting hardware to pass therethrough.

14. A hanger bar assembly of claim 13 wherein said attachment members include a depending portion including a means for locating said assembly such that when a surface covering is placed over said assembly and the outlet box is secured to said assembly, the outlet box is in proper relation to said covering.

15. A hanger bar assembly of claim 14 wherein said locating means includes at least one score mark disposed on said depending portion for aiding in locating said assembly with respect to said support elements.

16. A hanger bar assembly of claim 15 wherein said at least one score mark includes a plurality of score marks extending substantially perpendicular to said depending portion, each of said plurality of score marks being identified by type of outlet box thereby permitting said assembly to be used with a variety of outlet boxes.

17. A hanger bar assembly for supporting an outlet box to spaced apart support elements comprising:

a support member including a first elongated channel member telescopically receivable within a second elongated channel member for longitudinal adjustment of said support member, each of said channel members having a back wall and a pair of spaced side walls depending downwardly therefrom, said side walls having inturned flanges spaced from said back wall forming a channel member interior, said flanges of said first and second channel members extending obliquely toward said respective back wall into said channel interior;

a fastening element slidably supported within said first channel member;

a mounting device for attaching said outlet box to said fastening element so as to clamp said first and second channel members between said fastening element and said outlet box thereby urging both said side walls and said flanges of said channel members together resulting in restriction of movement between said first and second channel members; and an attachment member for securing said hanger bar assembly to the spaced apart support elements.

18. A hanger bar assembly for supporting an outlet box comprising:

a support member including a first elongated channel member telescopically receivable within a second elongated channel member for longitudinal adjustment of said support member, each of said first and second channel members having a back wall and a pair of spaced side walls depending downwardly therefrom, each of said first and second channel member side walls having inturned flanges spaced from said back wall forming a channel member interior, said flanges extending obliquely into said channel interior toward said back wall, said flanges have an upper and lower surface, and said upper flange surface of said second channel member having a plurality of gripping members extending the length of said channel member, said flanges of each channel member having spaced opposing ends that define a slot extending the length of each channel member, said channel members being aligned such that said slot of said first channel member is aligned with said slot of said second channel member;

a fastening plate disposed within said first channel member, said fastening plate having a generally planar surface slidably supported by said flanges of said first channel member, said fastening plate having a plurality of projections extending downwardly therefrom, said projections extending through said slots and being engagable with the outlet box to provide alignment therefor;

said fastening plate further including a plurality of apertures, said apertures being aligned with said channel slots and being adapted to threadedly engage outlet box securing hardware, such that upon securing of said outlet box to said fastening plate, said gripping members engage said flange bottom surface of said first channel member longitudinal movement of said channel members is restricted; and a pair of end plates for securing said assembly to a structure, said end plates formed on one end of each channel member and disposed in opposed relation at opposite ends of said support member.

19. A hanger bar assembly for supporting an outlet box comprising:

a pair of hollow telescopically extensible members, each of said members having a substantially similar cross-sectional profile, each of said pair of members having a back wall and a pair of spaced side walls divergently extending outwardly from said back wall;

each of said pair of side walls having a flange extending therefrom generally opposed from said back wall and, forming a mounting surface for the outlet box; said mounting surface having a transverse extent greater than a transverse extent of said back wall such that said pair of members have a center of gravity positioned closer to said mounting surface than a geometric center line is positioned; and a fastening element disposed within said pair of members adjacent said flanges and adapted to secure said outlet box.

* * * * *